US008527635B2

(12) United States Patent
Jeon et al.

(10) Patent No.: US 8,527,635 B2
(45) Date of Patent: Sep. 3, 2013

(54) CONTENTS DELIVERY SYSTEM AND METHOD, WEB SERVER AND CONTENTS PROVIDER DNS SERVER THEREOF

(75) Inventors: Jae Sic Jeon, Seoul (KR); Kyong Hwan Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 249 days.

(21) Appl. No.: 12/540,234

(22) Filed: Aug. 12, 2009

(65) Prior Publication Data
US 2010/0042724 A1 Feb. 18, 2010

Related U.S. Application Data

(60) Provisional application No. 61/088,541, filed on Aug. 13, 2008.

(51) Int. Cl.
*G06F 15/173* (2006.01)

(52) U.S. Cl.
USPC .......................... 709/226; 709/203; 709/223

(58) Field of Classification Search
USPC .......................... 709/203, 226, 223
See application file for complete search history.

(56) References Cited

U.S. PATENT DOCUMENTS

| | | | | |
|---|---|---|---|---|
| 6,108,703 A * | 8/2000 | Leighton et al. | | 709/226 |
| 6,357,010 B1 * | 3/2002 | Viets et al. | | 726/4 |
| 6,484,204 B1 * | 11/2002 | Rabinovich | | 709/226 |
| 6,799,214 B1 * | 9/2004 | Li | | 709/226 |
| 7,082,476 B1 * | 7/2006 | Cohen et al. | | 709/246 |
| 7,216,154 B1 * | 5/2007 | Chow et al. | | 709/219 |
| 7,454,500 B1 * | 11/2008 | Hsu et al. | | 709/226 |
| 7,912,954 B1 * | 3/2011 | Oesterreicher et al. | | 709/226 |
| 2001/0049732 A1 * | 12/2001 | Raciborski et al. | | 709/224 |
| 2002/0026511 A1 * | 2/2002 | Garcia-Luna-Aceves et al. | | 709/226 |
| 2002/0112036 A1 * | 8/2002 | Bohannon et al. | | 709/220 |
| 2002/0184334 A1 * | 12/2002 | Cherry et al. | | 709/217 |
| 2003/0177122 A1 * | 9/2003 | Makansi et al. | | 707/10 |
| 2004/0049579 A1 * | 3/2004 | Ims et al. | | 709/225 |
| 2004/0249939 A1 * | 12/2004 | Amini et al. | | 709/225 |
| 2004/0267930 A1 * | 12/2004 | Giulio et al. | | 709/225 |
| 2005/0198309 A1 * | 9/2005 | Li et al. | | 709/227 |
| 2006/0020684 A1 * | 1/2006 | Mukherjee et al. | | 709/219 |
| 2006/0288119 A1 * | 12/2006 | Kim et al. | | 709/238 |
| 2007/0005689 A1 * | 1/2007 | Leighton et al. | | 709/203 |
| 2008/0086574 A1 * | 4/2008 | Raciborski et al. | | 709/245 |
| 2008/0163064 A1 * | 7/2008 | Swildens et al. | | 715/736 |
| 2008/0208961 A1 * | 8/2008 | Kim et al. | | 709/203 |
| 2008/0263180 A1 * | 10/2008 | Hurst et al. | | 709/219 |
| 2009/0132640 A1 * | 5/2009 | Verma et al. | | 709/203 |
| 2009/0248893 A1 * | 10/2009 | Richardson et al. | | 709/239 |
| 2009/0327517 A1 * | 12/2009 | Sivasubramanian et al. | | 709/238 |

* cited by examiner

*Primary Examiner* — Emmanuel L Moise
*Assistant Examiner* — Waseem Ashraf
(74) *Attorney, Agent, or Firm* — Lowe Hauptman & Ham LLP

(57) ABSTRACT

A contents delivery system and method, a web server and a contents provider DNS server of the contents delivery system are provided. A web server or a DNS server of a contents provider determines whether a client is located in proximity to the web server, dynamically selects a server which will provide a page embedded object and provides the page embedded object from the selected server to the client. Accordingly, users can easily use contents and the contents provider can promote qualitative improvement of service.

15 Claims, 3 Drawing Sheets

CONTENTS DELIVERY SYSTEM AND METHOD, WEB SERVER AND CONTENTS PROVIDER DNS SERVER THEREOF

BACKGROUND OF THE INVENTION

1. Field of the Invention

The present invention relates to a contents delivery system and method, and more particularly, to a contents delivery system and method for allowing a web server or a contents provider domain name system (DNS) server of a contents provider providing a page including an embedded object to a client to determine whether the contents provider directly provides the embedded object or a host server of a contents delivery network (CDN) provider provides the embedded object in consideration of proximity of the client to the web server, the web server and the contents provider DNS server.

2. Description of the Related Art

A web server of a contents provider (CP) generally provides a large number of contents (for example, videos, music, files, etc.) to clients. A large load is generated when the web server provides the whole or some of the contents to a plurality of clients one to one because the plurality of clients exist in a plurality of Internet service providers (ISPs) while the web server is connected to a single ISP.

Accordingly, traffic between ISPs exponentially increases as the number of contents providers and clients increase, and thus transmission delay and/or transmission failure rate due to traffic congestion increase. Web server fail-over may occur in the worst case.

To solve this problem, a contents delivery network (CDN) is introduced. The CDN is a service which previously stores contents converging on a web server of a contents provider located at a great distance from clients, for example, contents with large capacity, such as pictures, banners, videos or audio, or contents frequently requested by clients, in host servers globally deployed at points of presence (PoP) of a plurality of ISPs and redirects the path of the host server closest to a client when the client requests the contents provider to provide contents such that the client accesses the host server through the redirected path to be provided with the contents. Here, the host server may be referred to as a cache server, a replica server or a ghost server.

The CDN is classified into an overlay type and a network type according to system configuration. In the overlay type CDN, a server for a special purpose and a plurality of cache servers manage distribution of contents. The overlay type CDN has an advantage of simple administration because there is no need for a CDN provider to control network lower layer. In the network type CDN, network components such as a router and a switch include codes for confirming a specific application type and forwarding requests of clients according to a predetermined policy.

Recently, most of solutions of CDN providers have adopted mixture of the overlay and network types. An example of mixture of the two types is disclosed in U.S. Pat. No. 6,108,703 (Referred to as '703 patent hereinafter) entitled "Global hosting system", issued to F. Thomson Lieghton et al., and assigned to MIT (Massachusetts Institute of Technology).

According to the '703 patent, a web server of a contents provider provides a page including a uniform resource locator (URL) (referred to as 'modified URL' hereinafter) of an embedded object, which is modified according to a special routine, in response to a request of a client. The web browser of the client loads the embedded object in order to display the page. The '703 patent identifies the modified URL through hierarchical DNS servers called a first level name server and a second level name server and returns the IP address of the optimum host server capable of providing the actual object to the client.

The '703 patent uses so-called DNS-based request routing. Although general DNS-based request routing has a problem that network latency according to DNS look-up time is aggravated, the '703 patent decreases network latency by constructing hierarchical DNS servers.

However, even when the client is located in proximity to the web server of the contents provider, that is, when the client and the web server of the contents provider are close to each other geographically or on a network route, the DNS-based request routing is performed, which is inefficient.

Accordingly, a method for solving the aforementioned problems is required.

SUMMARY OF THE INVENTION

An object of the present invention is to allow a web server of a contents provider to directly provide contents requested by a client located in proximity to the web server to the client to provide improved quality of service (QoS) to the neighboring client and decrease useless network load.

To accomplish the object to the present invention, according to an aspect of the present invention, there is provided a contents delivery system including: at least one host server receiving and storing an object embedded in a page; a web server storing the page and the object, transmitting the object to the at least one host server such that the at least one host server stores the object, transmitting the page to a client when the client is located in proximity to the web server, rewriting the URL representing the position of the page embedded object stored in the host server and transmitting the rewritten page to the client when the client is not located in proximity to the web server at the request of the client; and a CDN DNS server corresponding to the URL and transmitting the IP address of a specific host server which will transmit the object, selected from the at least one host server, to the client through a local DNS server at the client when receiving inquiry of the local DNS server about the IP address of the host server storing the object.

The web server may determine whether the client is located in proximity to the web server by using the IP address of the client.

The web server may rewrite the URL when data traffic thereof exceeds a critical value.

The CDN DNS server may transmit the IP address of the specific host server to the local DNS server in consideration of at least one of data traffic information of the at least one host server, information on proximity of the client to the at least one host server and object information stored in the at least one host server.

According to another aspect of the present invention, there is provided a contents delivery system including: a web server providing a page and an object embedded in the page; at least one host server of a plurality of CDN providers, which receives the object from the web server and stores the object; a contents provider DNS server transmitting the IP address of the web server to a client through a local DNS server at the client when the client is located in proximity to the web server and transmitting domain name information of a host server storing the object to the local DNS server when the client is not located in proximity to the web server when receiving inquiry of the local DNS server about the IP address of the host server storing the object from the local DNS server; and a CDN DNS server corresponding to the domain name information and transmitting the IP address of a specific host server which will transmit the object, selected from the at least one host server, to the client through the local DNS server when the local DNS server inquires of the CDN DNS server about the IP address of the host server storing the object.

The contents provider DNS server may embed the domain name information in a CNAME resource record and transmit the CNAME resource record to the local DNS server.

The local DNS server may inquire of the CDN DNS server about the IP address of the host server storing the object with reference to the domain name information embedded in the CNAME resource record.

The contents provider DNS server may determine whether the client is located in proximity to the web server by using the IP address of the client.

The CDN DNS server may transmit the IP address of the specific host server to the local DNS server in consideration of at least one of data traffic information of the at least one host server, information on proximity of the client to the at least one host server and object information stored in the at least one host server.

According to another aspect of the present invention, there is provided a contents delivery method including: a storing step in which at least one host server receives a page and an object embedded in the page from a web server and stores the page embedded object; a determination step in which the web server determines whether a client is located in proximity to the web server when the client requests the web server to provide the page; a page transmitting step in which the web server rewrites the URL representing the position of the page embedded object stored in the host server and transmitting the rewritten page to the client when the client is not located in proximity to the web server; and an IP address transmitting step in which a CDN DNS server corresponding to the URL and receiving inquiry of a local DNS server at the client receiving the page about the IP address of the host server storing the object transmits the IP address of a specific host server which will transmit the object, selected from the at least one host server, to the client through the local DNS server.

In the determination step, the web server may determine whether the client is located in proximity to the web server with reference to the IP address of the client.

According to another aspect of the present invention, there is provided a contents delivery method including: a storing step in which at least one host server receives a page and an object embedded in the page from a web server and stores the page and the object; a delivery step in which a contents provider DNS server determines whether a client receiving the page from the web server is located in proximity to the web server and delivers domain name information of the host server to a local DNS server at the client if the client is not located in proximity to the web server when the local DNS server inquires of the contents provider DNS server about the IP address of a server storing the object; and a transmission step in which a CDN DNS server corresponding to the domain name information and receiving inquiry of the local DNS server about the IP address of the host server storing the object transmits the IP address of a specific host server which will transmit the object, selected from the at least one host server, to the client through the local DNS server.

In the delivery step, the contents provider DNS server may embed the domain name information in a CNAME resource record and deliver the CNAME resource record to the local DNS server.

In the transmission step, the local DNS server may inquire of the CDN DNS server about the IP address of the host server storing the object with reference to the domain name information embedded in the CNAME resource record.

In the delivery step, the CDN DNS server may determine whether the client is located in proximity to the web server with reference to the IP address of the client.

According to another aspect of the present invention, there is provided a web server including: a first transmitting/receiving unit transmitting/receiving data; a contents database storing a page and an object embedded in the page; a first determination module determining whether a client that requests the page is located in proximity to the web server; and a first controller transmitting the object to at least one host server through the first transmitting/receiving unit such that the at least one host server stores the object, transmitting the page to the client through the first transmitting/receiving unit when the first determination module determines that the client is located in proximity to the web server, rewriting the URL representing the position of the object stored in the host server and transmitting the rewritten page to the client through the first transmitting/receiving unit if the first determination module determines that the client is not located in proximity to the web server when the client requests the web server to provide the object through the first transmitting/receiving unit.

The first determination module may determine whether the client is located in proximity to the web server by using the IP address of the client.

The first controller may rewrite the URL when data traffic exceeds a critical value.

According to another aspect of the present invention, there is provided a contents provider DNS server including: a second transmitting/receiving unit transmitting/receiving data; a host server information database storing address information of at least one host server storing a page and an object embedded in the page transmitted from a web server; a second determination module determining whether a client receiving the page is located in proximity to the web server; and a second controller transmitting the IP address of the web server to the client through the second transmitting/receiving unit via a local DNS server at the client if the second determination module determines that the client is located in proximity to the web server and delivering domain name information of the host server to the local DNS server through the second transmitting/receiving unit if the second determination module determines that the client is not located in proximity to the web server when receiving inquiry of the local DNS server about the IP address of a server storing the object through the second transmitting/receiving unit.

The second determination module may determine whether the client is located in proximity to the web server by using the IP address of the client.

The second controller may embed the domain name information in a CNAME resource record and deliver the CNAME resource record to the local DNS server.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
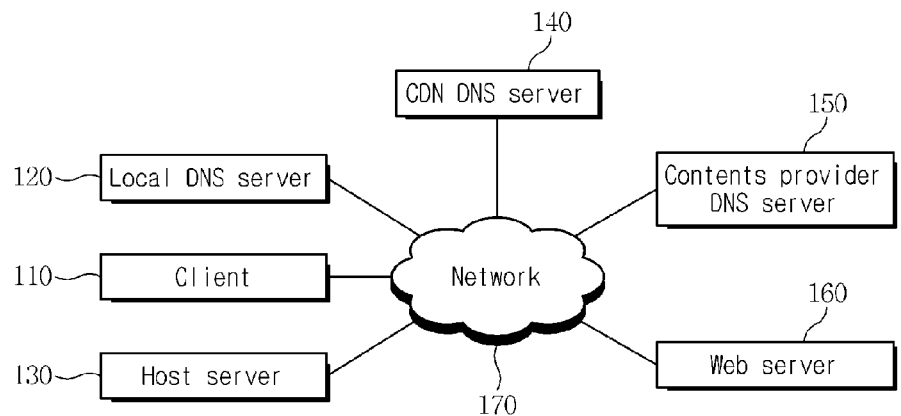
FIG. 1 is a configuration of a contents delivery system according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

FIG. 1 illustrates a configuration of a contents delivery system according to an embodiment of the present invention. Referring to FIG. 1, the contents delivery system includes a client 110, a local domain name system (DNS) server 120, a host server 130, a CDN DNS server 140, a contents provider DNS server 150, a web server 160 and a network 170.

The client 110 corresponds to equipment such as a computer receiving information from the servers connected through the network 170. For example, the client 110 includes equipment which is currently commercially used or will be developed such as personal computers (PCs), household appliances, mobile communication devices, etc. in the current embodiment of the invention.

The client 110 includes a browser and a resolver. When a uniform resource locator (URL) that requests specific contents is input to the browser of the client 110, the resolver connected to the browser accesses the previously registered local DNS server 120 and resolves a domain name corresponding to the URL into the IP (Internet Protocol) address of the web server 160 providing the contents.

In the current embodiment of the invention, when the client 110 receives a page from the web server 160 by using the IP address of the web server 160, the client 110 parses the page and inquires of the local DNS server 120 about the IP address of a server which will provide an embedded object detected while the page is parsed by using the URL of the embedded object. Then, when the client 110 receives the IP address of the web server 160 or the host server 130, which will transmit the embedded object, from the local DNS server 120, the client 110 accesses the corresponding server by using the IP address and receives the embedded object.

The local DNS server 120 means a domain name server that transforms a domain name into an IP address and converts a symbolic name into a numeral address used by machines. The local DNS server 120 that receives the domain name of the web server 160 from the resolver accesses the contents provider DNS server 150, receives the IP address of the web server 160, which corresponds to the domain name, and transmits the IP address to the client 110.

When the client 110 requests the local DNS server 120 to provide the IP address of the server storing the embedded object included in the page, the local DNS server 120 transmits/receives messages to/from the contents provider DNS server 150 or the CDN DNS server 140 to transmit the IP address of the web server 160 or the host server 130 which will transmit the embedded object to the client 110.

The host server 130 stores replicas of page embedded objects stored in and administrated by the web server 160 and rapidly provides the replicas when the client 110 requests the host server 130 to provide contents.

The CDN DNS server 140 is a DNS server of a CDN provider and provides the IP address of the host server 130 storing the embedded object at the request of the local DNS server 120. The CDN DNS server 140 of the present invention not only performs a general DNS server function but also selects the host server 130 efficient to provide the embedded object to the client 110 in consideration of at least one of data traffic information of at least one host information 130, information on proximity of the client 110 to the at least one host server 130 and object information stored in the at least one host server 130 and transmits the IP address of the selected host server 130 to the client 110 through the local DNS server 120.

Here, the data traffic information of the at least one host information 130, the information on proximity of the client 110 to the at least one host server 130 and the object information stored in the at least one host server 130, considered by the CDN DNS server 140, may be collected in consideration of data traffic and load of the CDN DNS server 140 or the host server 130 when the object stored in the host server 130 is updated and at predetermined time such as a specific period.

The web server 160 provides a web page and an embedded object included in the web page, provided by the contents provider. In the current embodiment of the present invention, the contents provider transmits the embedded object from the web server 160 to the host server 130 such that the host server 130 stores the embedded object. Accordingly, when the client 110 requests the embedded object included in the page, the client 110 can rapidly receive a response through the host server 130.

Furthermore, the web server 160 determines whether the client 110 is located in proximity to the web server 160 when the client 110 requests the web server 160 to provide the page. When the web server 160 determines that the client 110 is located in proximity to the web server 160 and thus direct transmission of the embedded object from the web server 160 to the client 110 is more efficient in terms of network route than routing to a network of a CDN provider, the web server 160 transmits the page to the client 110 without modifying the page. When the client 110 parses the received page, detects the URL of the embedded object and requests the web server 160 to provide the embedded object, the web server 160 directly transmits the embedded object to the client 110.

On the contrary, when the web server 160 determines that the client 110 is not located in proximity to the web server 160 and thus routing to the network of the CDN provider to transmit the embedded object from the host server 130 is more efficient in terms of network route, the web server 160 rewrites the URL representing the position of the embedded object such that the URL represents the host server 130 and transmits the modified page to the client 110. When the client 110 parses the modified page and detects the modified URL, the client 110 accesses the host server 130 by using the modified URL to receive the embedded object.

The operation of determining whether the client 110 is located in proximity to the web server 160 may be performed by determining whether the web server 160 and the client 110 are close to each other by using the IP address of the client 110, for example.

Furthermore, when the web server 160 determines that the data traffic of the web server 160 exceeds a critical value and thus load of the web server 160 requires to decrease even if the web server 160 determines that the client 110 is located in proximity to the web server 160, the web server 160 can rewrite the URL of the embedded object in the page and route the object request to the network of the CDN provider to distribute the load of the web server 160.

In this manner, the client 110 can receive the embedded object through the network providing a more rapid response and the web server 160 can dynamically determine the subject of object transmission in consideration of user's convenience and the load thereof.

The contents provider DNS server 150 is a DNS server of the contents provider. When the contents provider DNS server 150 receives inquiry of the local DNS server 120 about the IP address of the web server 160 storing the page, the contents provider DNS server 150 returns the IP address. Furthermore, when the contents provider DNS server 150 receives inquiry of the local DNS server 120 about the IP address of a server storing the object included in the page, the contents provider DNS server 150 determines whether the client 110 and the web server 160 are located in proximity to each other in the aforementioned manner.

When the client 110 and the web server 160 are located in proximity to each other, the contents provider DNS server 150 transmits the IP address of the web server 160 to the client 110 through the local DNS server 120 such that the client 110 can receive the object embedded in the page from the web server 160.

When the client 110 and the web server 160 are not located in proximity to each other, the contents provider DNS server 150 transmits a domain name corresponding to the host server 130 to the local DNS server 120 such that the local DNS server 120 can acquire the IP address of the host server 130 by using the domain name. Accordingly, the client 110 can acquire the embedded object from the host server 130.

Here, the contents provider DNS server 150 can transmit the domain name to the local DNS server 120 through a canonical name (CANAME) method, for example. CNAME means DNS database record representing a host name.

That is, when the client 110 is located in proximity to the web server 160, the web server 160 can directly transmit the object requested by the client 110 to the client 110 without carrying out routing to the network of the CDN provider. This has been described above so that detailed explanation is omitted.

The network 170 corresponds to a data communication network for data transmission and information exchange among the client 110, the local DNS server 120, the host server 130, the CDN DNS server 140, the contents provider DNS server 150 and the web server 160. The network 170 according to the present invention includes Internet, Intranet, Extranet, and other wired and wireless networks and a combination thereof, which are well-known or will be developed.

The configuration and operation of the web server 160 according to an embodiment of the present invention will now be explained in more detail with reference to FIG. 2.

Figure 2:
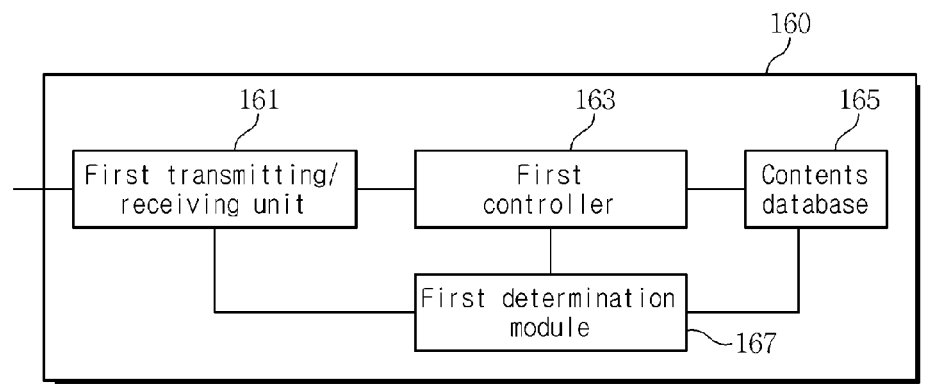
FIG. 2 is a block diagram of a web server illustrated in FIG. 1.

FIG. 2 is a block diagram of the web server 160 illustrated in FIG. 1. Referring to FIGS. 1 and 2, the web server 160 includes a first transmitting/receiving unit 161, a first controller 163, a contents database 165 and a first determination module 167.

The first transmitting/receiving unit 161 has an interface for transmitting/receiving data and messages through the network 170.

The contents database 165 stores pages and objects embedded in the pages.

The first determination module 167 determines proximity of the client 110 to the web server 160. Here, the proximity of the client 110 to the web server 160 can be determined by using the IP address of the client 110.

The first controller 163 controls the operation of the web server 160. Specifically, the first controller 163 transmits the page embedded objects stored in the contents database 165 to the at least one host server 130 through the first transmitting/receiving unit 161 such that the embedded objects are stored in the at least one host server 130.

When the first controller 163 receives a request of the client 110 for a page stored in the contents database 165 through the first transmitting/receiving unit 161, the first controller 163 transmits data of the page to the client 110 through the first transmitting/receiving unit 161 without modifying the data of the page when the first determination module determines that the client 110 and the web server 160 are located in proximity to each other. On the contrary, when the first determination module 167 determines that the client 110 and the web server 160 are not located in proximity to each other, the first controller 163 rewrites URLs representing positions of page embedded objects stored in the host server 130 to modify the page and transmits the modified page to the client 110 through the first transmitting/receiving unit 161.

Here, the first controller 163 can rewrite the URLs representing the positions of page embedded objects stored in the host server 130 and transmit the modified page to the client 110 when data traffic of the web server 160 exceeds a critical value so as to attempt to distribute load of the web server 160 even if the first determination module 167 determines that the client 110 and the web server 160 are located in proximity to each other.

The configuration and operation of the contents provider DNS server 150 according to the present invention will now be explained in more detail with reference to FIG. 3.

Figure 3:
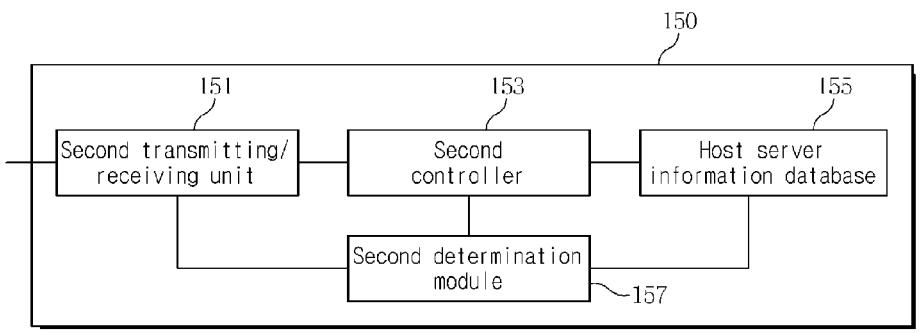
FIG. 3 is a block diagram of a contents provider DNS server illustrated in FIG. 1.

FIG. 3 is a block diagram of the contents provider DNS server 150 illustrated in FIG. 1. Referring to FIGS. 1 and 3, the contents provider DNS server 150 includes a second transmitting/receiving unit 151, a second controller 153, a host server information database 155 and a second determination module 157.

The second transmitting/receiving unit 151 has an interface for transmitting/receiving data and messages through the network 170.

The host server information database 155 stores domain name information corresponding to the host server 130 storing page embedded objects provided by the web server 160.

The second determination module 157 determines proximity of the client 110 to the web server 160. Here, the proximity of the client 110 to the web server 160 can be determined by using the IP address of the client 110, as described above.

The second controller 153 controls the operation of the contents provider DNS server 150. When the second controller 153 receives inquiry of the local DNS server 120 at the client 110 about the IP address of a server storing a page embedded object from the local DNS server 120 through the transmitting/receiving unit 151, the second controller 153 transmits the IP address of the web server 160 to the client 110 via the local DNS server 120 when the second determination module determines that the client 110 and the web server 160 are located in proximity to each other.

When the second determination module determines that the client 110 and the web server 160 are not located in proximity to each other, the second controller 153 transmits domain name information corresponding to the host server 130 storing the page embedded object to the local DNS server 120. Here, the domain name information can be transmitted through the CNAME method, as described above.

A contents delivery method according to the present invention will be explained with reference to FIGS. 4 and 5.

Figure 4:
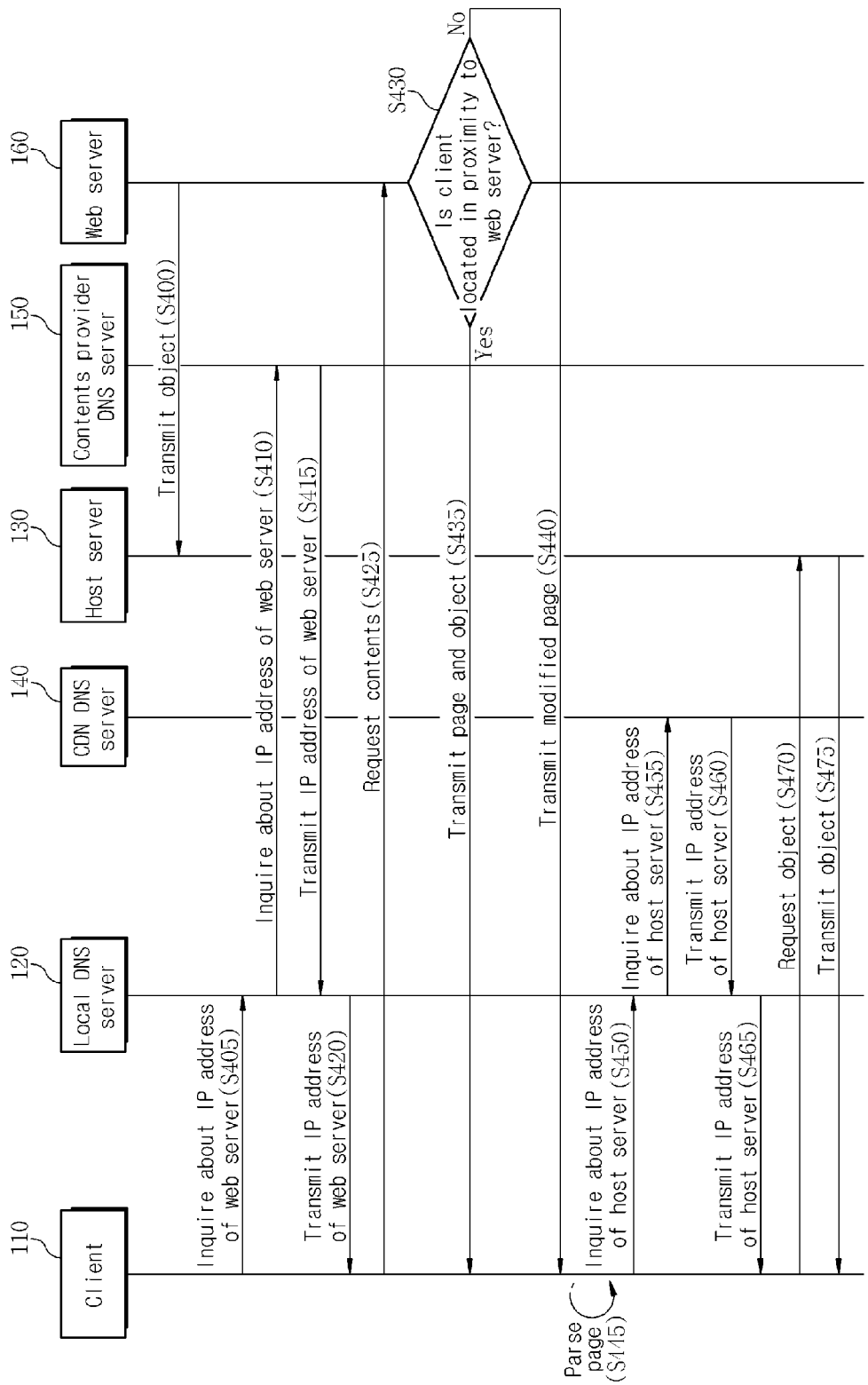
FIG. 4 is a flowchart showing a contents delivery method according to an embodiment of the present invention.

FIG. 4 is a flowchart showing a contents delivery method according to an embodiment of the present invention. Referring to FIG. 4, the host server 130 receives an object embedded in a page of the contents provider from the web server 160 and stores the embedded object in step S400. Contents, that is, the embedded object, may be transmitted in step S400 when the host server 130 requests the web server 160 to provide the embedded object, at specific periods, and when the object embedded in the page stored in the web server 160 is updated.

When the browser of the client 110 receives a URL for requesting the web server 160 to provide the embedded object, the resolver of the client 110 inquires of the local DNS server 120 about the IP address of the web server 160 storing the page and the embedded object in step S405.

The local DNS server 120 receives the inquiry about the IP address of the web server 160 in step S405 and inquires of the contents provider DNS server 150 about the IP address of the web server 160 storing the page and the embedded object in step S410.

The contents provider DNS server 150 receives the inquiry of the local DNS server 120 in step S410 and transmits the IP address of the web server 160 to the local DNS server 120 in step S415. The local DNS server 120 receives the IP address of the web server 160 and transmits the IP address of the web server 160 to the client 110 in step S420.

The client 110 receives the IP address of the web server 160 in step S420 and requests the web server 160 to provide the page embedded object by using the IP address of the web server 160 in step S425.

The web server 160 receives the request of the client 110 in step S425 and determines whether the client 110 is located in proximity to the web server 160 in step S430. Here, the web server 160 may determine the proximity of the client 110 to the web server 160 with reference to the IP address of the client 110.

When the web server 160 determines that the client 110 is located in proximity to the web server 160 in step S430, the web server 160 transmits the page to the client 110 without modifying the page, and then transmits the embedded object to the client 110 when the client 110 requests the web server 160 to provide the embedded object in step S430.

When the web server 160 determines that the client 110 is not located in proximity to the web server 160 in step S430, the web server 160 rewrites the URL representing the position of the embedded object in the page into a URL corresponding to the host server 130 of the CDN provider such that the host server 130 can receive the embedded object and transmits the modified page to the client 110 in step S440.

When the data traffic of the web server 160 exceeds a critical value and thus load distribution is required even if the web server 160 determines that the client 110 is located in proximity to the web server 160 in step S430, the web server 160 transmits page modified as described above to the client 110 such that the host server 130 can provide the embedded object.

The client 110 receives the modified page in step S440 and parses the page in step S445. When the URL representing the position of the embedded object is detected while the client 110 parses the page in step S445, the client 110 inquires of the local DNS server 120 about the IP address of the host server 130 storing the embedded object by using the URL in step S450.

The local DNS server 120 receives the inquiry of the client 110 in step S450 and inquires of the CDN DNS server 140 about the IP address of the host server 130 storing the embedded object in step S455.

The CDN DNS server 140 receives the inquiry of the local DNS server 120 in step S455, selects the host server 130 which will transmit the embedded object to the client 110 and transmits the IP address of the selected host server 130 to the local DNS server 120 in step S460. The local DNS server 120 transmits the received IP address of the host server 130 to the client 110 in step S465.

The IP address of the host server 130, transmitted from the CDN DNS server 140 in step S460, may correspond to the IP address of a specific host server 130 selected in consideration of at least one of data traffic information of at least one host server storing the embedded object, information on proximity of the client 110 to the at least one host server 130 and object information stored in the at least one host server.

The client 110 receives the IP address of the host server 130 in step S465, requests the host server 130 to transmit the embedded object by using the IP address of the host server 130 in step S470, and receives the embedded object from the host server 130 in step S475.

Figure 5:
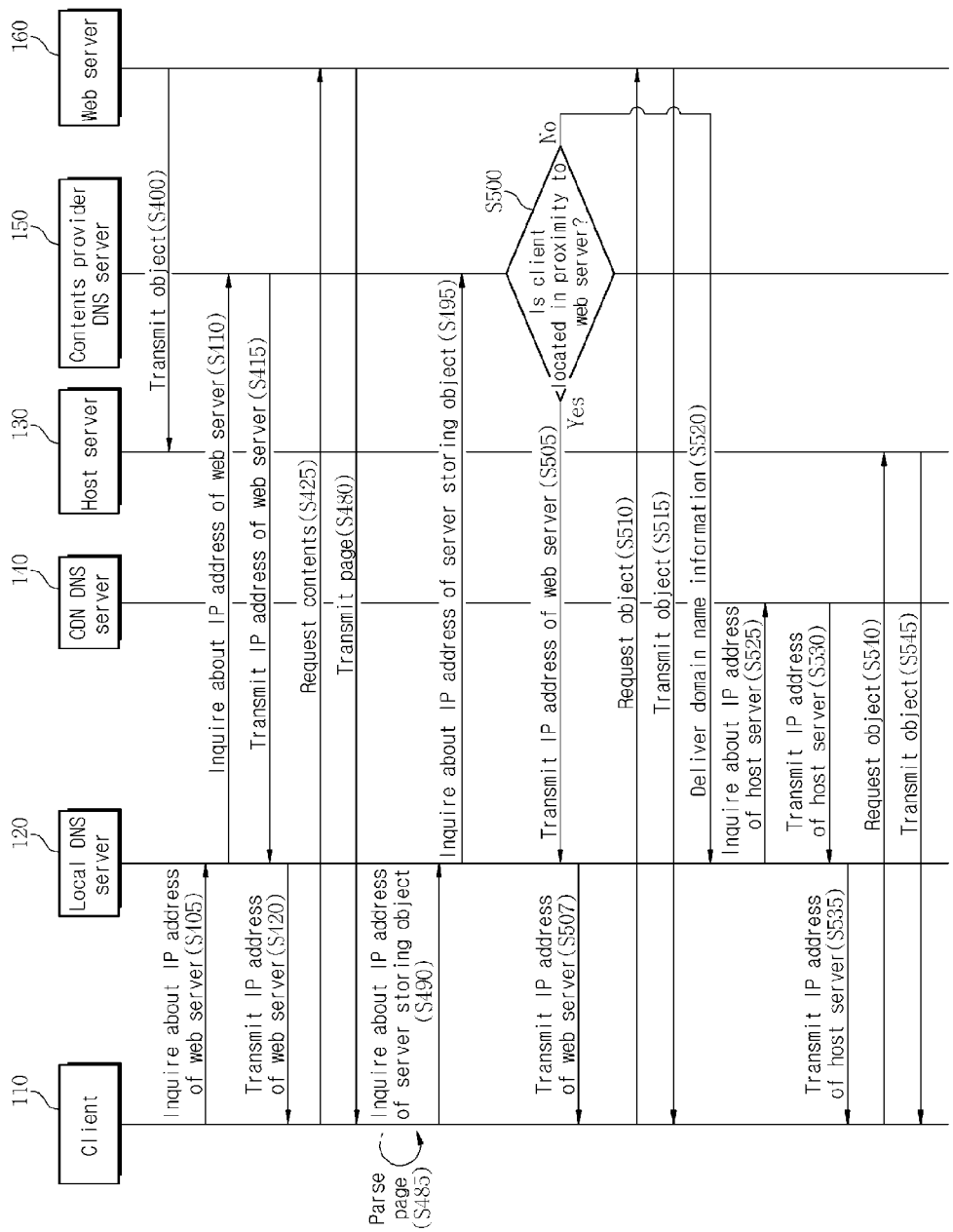
FIG. 5 is a flowchart showing a contents delivery method according to another embodiment of the present invention

FIG. 5 is a flowchart showing a contents delivery method according to another embodiment of the present invention. In FIG. 5, steps S400 through S425 are identical to those of the contents delivery method illustrated in FIG. 4 so that detailed explanations thereof are omitted.

The web server 160 receives a request of the client 110 for the page in step S425 and transmits the page to the client 110 in step S480.

The client 110 receives the page in step S480 and parses the page in step S485. When the URL representing the position of the embedded object is detected while the client 110 parses the page in step S485, the client 110 inquires of the local DNS server 120 about the IP address of a server storing the embedded object by using the URL in step S490.

The local DNS server 120 receives the inquiry of the client 110 in step S490 and inquires of the contents provider DNS server 150 about the IP address of the server 130 storing the embedded object in step S495.

The contents provider DNS server 150 receives the inquiry in step S495 and determines whether the client 110 is located in proximity to the web server 160 in step S500. Here, the contents provider DNS server 150 may determine the proximity of the client 110 to the web server 160 with reference to the IP address of the client 110.

When the contents provider DNS server 150 determines that the client 110 is located in proximity to the web server 160 in step S500, the contents provider DNS server 150 transmits the IP address of the web server 160 to the local DNS server 120 in step S505. The local DNS server 120 transmits the IP address of the web server 160 to the client 110 in step S507.

The client 110 requests the web server 160 to provide the embedded object by using the IP address of the web server 160, which is received in step S507, in step S510 and receives the embedded object from the web server 160 in step S515.

When the contents provider DNS server 150 determines that the client 110 is not located in proximity to the web server 160 in step S500, the contents provider DNS server 150 transmits domain name information corresponding to the host server 130 to the local DNS server 120 in step S520. The local DNS server 120 receives the domain name information in step S520 and inquires of the CDN DNS server 140 about the IP address of the host server 130 storing the embedded object by using the domain name information in step S525.

The contents provider DNS server 150 may embed the domain name information in a CNAME resource record and transmit the CNAME resource record to the local DNS server 120 in step S520. The local DNS server 120 may inquire of the CDN DNS server 140 about the IP address of the host server 130 with reference to the domain name information embedded in the CNAME resource record in step S525.

The CDN DNS server 140 receives the inquiry of the local DNS server 120 in step S525, selects the host server 130 which will transmit the embedded object to the client 110 and transmits the IP address of the selected host server 130 to the local DNS server 120 in step S530. The local DNS server 120 transmits the received IP address of the host server 130 to the client 110 in step S535.

The IP address of the host server 130, transmitted from the CDN DNS server 140 in step S530, may correspond to the IP address of a specific host server 130 selected in consideration of at least one of data traffic information of at least one host server storing the embedded object, information on proximity of the client 110 to the at least one host server 130 and object information stored in the at least one host server.

The client 110 receives the IP address of the host server 130 in step S535, requests the host server 130 to transmit the embedded object by using the IP address of the host server 130 in step eS540, and receives the embedded object from the host server 130 in step S545.

According to the present invention, the web server or the contents provider DNS server administrated and operated by the contents provider can select a server which will provide a page embedded object to a client in consideration of proximity of the client to the web server and a network route between the client and the web server. Accordingly, the client can receive, load and display the page embedded object, and thus users can easily use contents and the contents provider can provide contents with high quality without imposing large load on the web server.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A contents delivery system for delivery of a page and an object embedded in the page, said system comprising:
   at least one host server;
   a web server;
   a Contents Provider (CP) Domain Name System (DNS) server; and
   a Content Delivery Network (CDN) Domain Name System (DNS) server;
   wherein
   the at least one host server is configured to receive and store the object without storing the page;
   the web server is configured to receive and store both the page and the object, and transmit the object to the at least one host server such that the at least one host server stores the object,
   the CP DNS server is configured to
      receive a first request from a client, via a local DNS server of the client, asking for an Internet Protocol (IP) address of the web server, and
      transmit the IP address of the web server, in response to the first request, to the client via the local DNS server;
   the web server is configured to, in response to a second request for contents corresponding to the page from the client that has received the IP address of the web server, transmit the page with the object to the client when the client is located in proximity to the web server, and rewrite a Uniform Resource Locator (URL) representing the position of the object stored in the host server and transmit the page having the rewritten URL to the client when the client is not located in proximity to the web server; and
   the CDN DNS server corresponding to the URL is configured to
      receive, from the client that has received the page with the rewritten URL and through the local DNS server, an inquiry about an IP address of the host server that stores the object,
      select from the at least one host server a specific host server to provide the object, and
      transmit the IP address of the selected host server to the client through the local DNS server to enable the client to retrieve the object from the selected host server.

2. The contents delivery system of claim 1, wherein the web server determines whether the client is located in proximity to the web server by using the IP address of the client.

3. The contents delivery system of claim 1, wherein the web server rewrites the URL when data traffic of the web server exceeds a critical value.

4. The contents delivery system of claim 1, wherein the CDN DNS server transmits the IP address of the selected host server to the local DNS server in consideration of data traffic information of the at least one host server, information on proximity of the client to the at least one host server and object information stored in the at least one host server.

5. A contents delivery system, comprising:
   at least one host server;
   a web server;
   a Contents Provider (CP) Domain Name System (DNS) server; and
   a Content Delivery Network (CDN) Domain Name System (DNS) server;
   wherein
   the web server is configured to store storing a page and an object embedded in the page;
   the at least one host server is configured to receive the object from the web server and store the object without storing the page;
   the CP DNS server is configured to
      receive a first request from a client, via a local DNS server of the client, asking for an Internet Protocol (IP) address of the web server, and
      transmit the IP address of the web server, in response to the first request, to the client via the local DNS server;
   the web server is configured to, in response to a second request for contents corresponding to the page from the client that has received the IP address of the web server, transmit the page without the embedded object to the client, the transmitted page having a Uniform Resource Locator (URL) that represents the position of the object;
   the CP DNS server is further configured to
      receive, from the client that has received the page with the URL and through the local DNS server, an inquiry about an IP address of a server that stores the object, and
      in response to the inquiry,
         transmit the IP address of the web server to the client through the local DNS server of the client when the client is located in proximity to the web server, and
         transmit domain name information of a host server storing the object to the local DNS server when the client is not located in proximity to the web server,
   the web server is further configured to transmit the object to the client in response to a third request for the object from the client who has received the IP address of the web server in reply to the client's inquiry; and
the CDN DNS server corresponding to the domain name information is configured to
receive from the local DNS, that has received the domain name information, another inquiry about an IP address of the host server that stores the object,
select from the at least one host server a specific host server to provide the object, and
transmit the IP address of the selected host server to the client through the local DNS server to enable the client to retrieve the object from the selected host server.

6. The contents delivery system of claim 5, wherein the CP DNS server embeds the domain name information in a Canonical Name (CNAME) resource record and transmits the CNAME resource record to the local DNS server.

7. The contents delivery system of claim 6, wherein the local DNS server inquires of the CDN DNS server about the IP address of the host server storing the object with reference to the domain name information embedded in the CNAME resource record.

8. The contents delivery system of claim 5, wherein the CP DNS server determines whether the client is located in proximity to the web server by using the IP address of the client.

9. The contents delivery system of claim 5, wherein the CDN DNS server transmits the IP address of the selected host server to the local DNS server in consideration of data traffic information of the at least one host server, information on proximity of the client to the at least one host server and object information stored in the at least one host server.

10. A contents delivery method for delivery of a page and an object embedded in the page, the method comprising:
a step in which at least one host server receives the object from a web server storing both the page and the object and stores the object;
a step in which a contents provider (CP) Domain Name System (DNS) server
receives a first request from a client, via a local DNS server of the client, asking for an Internet Protocol (IP) address of the web server, and
transmits the IP address of the web server, in response to the first request, to the client via the local DNS server;
a step in which the web server
receives a second request for contents corresponding to the page from the client that has received the IP address of the web server,
determines whether the client is located in proximity to the web server,
transmits the page with the object to the client when the client is located in proximity to the web server, and
rewrites the Uniform Resource Locator (URL) representing the position of the object stored in the host server and transmits the page having the rewritten URL to the client when the client is not located in proximity to the web server; and
a step in which a Content Delivery Network (CDN) Domain Name System (DNS) server corresponding to the URL
receives, from the client that has received the page with the rewritten URL and through the local DNS server, an inquiry about an IP address of the host server storing the object,
selects from the at least one host server a specific host server to provide the object, and
transmits the IP address of the selected host server to the client through the local DNS server to enable the client to retrieve the object from the selected host server.

11. The contents delivery method of claim 10, wherein the web server determines whether the client is located in proximity to the web server with reference to the IP address of the client.

12. A contents delivery method for delivery of a page and an object embedded in the page, the method comprising:
a step in which at least one host server receives the object from a web server storing both the page and the object and stores the object;
a step in which a contents provider (CP) Domain Name System (DNS) server
receive a first request from a client, via a local DNS server of the client, asking for an Internet Protocol (IP) address of the web server, and
transmit the IP address of the web server, in response to the first request, to the client via the local DNS server;
a step in which the web server
receives a second request for contents corresponding to the page from the client that has received the IP address of the web server,
transmits the page without the embedded object to the client, the transmitted page having a Uniform Resource Locator (URL) that represents the position of the object;
a step in which the CP DNS
receives, from the client that has received the page with the URL and through the local DNS server, an inquiry about an IP address of a server that stores the object,
in response to the inquiry, determines whether the client is located in proximity to the web server,
delivers domain name information of the host server storing the object to the local DNS server of the client if the client is not located in proximity to the web server, and
transmits the IP address of the web server to the client through the local DNS server of the client when the client is located in proximity to the web server;
a step in which the web server transmits the object to the client in response to a third request for the object from the client who has received the IP address of the web server in reply to the client's inquiry; and
a step in which a Content Delivery Network (CDN) DNS server corresponding to the domain name information
receives from the local DNS server, that has received the domain name information, another inquiry about an IP address of the host server storing the object,
select from the at least one host server a specific host server to provide the object, and
transmits the IP address of the selected host server to the client through the local DNS server to enable the client to retrieve the object from the selected host server.

13. The contents delivery method of claim 12, wherein the contents provider DNS server embeds the domain name information in a Canonical Name (CNAME) resource record and delivers the CNAME resource record to the local DNS server.

14. The contents delivery method of claim 13, wherein the local DNS server inquires of the CDN DNS server about the IP address of the host server storing the object with reference to the domain name information embedded in the CNAME resource record.

15. The contents delivery method of claim 12, wherein the contents provider DNS server determines whether the client is located in proximity to the web server with reference to the IP address of the client.

* * * * *